United States Patent
Mellberg (10) Patent No.: US 9,377,067 B2
(45) Date of Patent: Jun. 28, 2016

(54) DEVICE FOR FITTING AND REMOVAL OF BRAKE CALIPERS AND METHOD FOR FITTING AND REMOVING SUCH A BRAKE CALIPER

(71) Applicant: SCANIA CV AB, Södertälje (SE)

(72) Inventor: Lars Mellberg, Södertälje (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/409,566

(22) PCT Filed: Jun. 12, 2013

(86) PCT No.: PCT/SE2013/050680
§ 371 (c)(1),
(2) Date: Dec. 19, 2014

(87) PCT Pub. No.: WO2013/191620
PCT Pub. Date: Dec. 27, 2013

(65) Prior Publication Data
US 2015/0198208 A1 Jul. 16, 2015

(30) Foreign Application Priority Data

Jun. 20, 2012 (SE) .................................. 1250663

(51) Int. Cl.
*B66C 1/00* (2006.01)
*F16D 65/00* (2006.01)
(Continued)

(52) U.S. Cl.
CPC ............. *F16D 65/0043* (2013.01); *B23P 19/04* (2013.01); *F16D 55/00* (2013.01); *F16D 65/02* (2013.01); *F16D 2250/00* (2013.01)

(58) Field of Classification Search
CPC .............. B66C 1/62; B66C 1/10; B66C 1/24; B66C 1/663; B66C 13/08; B66C 1/12; B66C 1/54; F16D 65/0043; F16D 65/02; F16D 55/00; F16D 2250/00; B23P 19/04
See application file for complete search history.

(56) References Cited

U.S. PATENT DOCUMENTS

| | | | | |
|---|---|---|---|---|
| 2,412,488 A | * | 12/1946 | Austin | ....................... B66C 1/10 294/81.3 |
| 3,146,016 A | * | 8/1964 | Daymon, Jr. | .......... B64F 5/0036 294/81.3 |

(Continued)

FOREIGN PATENT DOCUMENTS

| FR | 2 956 852 A1 | 9/2011 |
|---|---|---|
| JP | H03-131437 | 6/1991 |

(Continued)

OTHER PUBLICATIONS

International Search Report dated Sep. 19 2013 issued in corresponding International patent application No. PCT/SE2013/050680.

(Continued)

*Primary Examiner* — Stephen Vu
(74) *Attorney, Agent, or Firm* — Ostrolenk Faber LLP (57) ABSTRACT

A method and a device for fitting and removal of brake calipers (2), the device having a frame portion (38) connected to a fastening portion (40) for fastening the device (36) on the brake caliper (2). The frame portion (38) is provided with a lifting device (42), (44). The fastening portion (40) has connecting portions (18) engaged with at least one fastening point (20) for a component. A brake caliper bracket (16) which cooperates with the brake caliper (2). The connecting portions (18) of the fastening portion (40) are of substantially the same geometrical shape as the brake caliper bracket's connecting portions (18) which connect with the brake caliper (2).

7 Claims, 6 Drawing Sheets

(51) Int. Cl.
*B23P 19/04* (2006.01)
*F16D 65/02* (2006.01)
*F16D 55/00* (2006.01)

(56) References Cited

U.S. PATENT DOCUMENTS

| | | | |
|---|---|---|---|
| 4,005,874 A * | 2/1977 | Ohtani | B62J 6/20 |
| | | | 116/28 R |
| 4,239,196 A | 12/1980 | Hanger | 269/17 |
| 4,431,223 A * | 2/1984 | Miller | B66C 1/10 |
| | | | 294/67.5 |
| 5,077,886 A | 1/1992 | Hashimoto et al. | |
| 5,462,250 A | 10/1995 | Fells | |
| 5,671,960 A * | 9/1997 | Chyz | B66C 1/107 |
| | | | 294/67.5 |
| 2005/0081355 A1 | 4/2005 | Nechvatal | |
| 2008/0087507 A1 | 4/2008 | DeMorais et al. | |

FOREIGN PATENT DOCUMENTS

KR 0124480 Y1 10/1998
WO WO 2009/127008 A1 10/2009

OTHER PUBLICATIONS

Supplementary European Search Report, dated Mar. 9, 2016, issue in corresponding European Patent Application No. EP13806503. Total 2 pages.

* cited by examiner

DEVICE FOR FITTING AND REMOVAL OF BRAKE CALIPERS AND METHOD FOR FITTING AND REMOVING SUCH A BRAKE CALIPER

CROSS-REFERENCE TO RELATED APPLICATIONS

The present application is a 35 U.S.C. §§371 National Phase conversion of PCT/SE2013/050680, filed Jun. 12, 2013, which claims priority of Swedish Patent Application No. 1250663-0, filed Jun. 20, 2012, the contents of which are incorporated by reference herein. The PCT International Application was published in the English language.

BACKGROUND TO THE INVENTION AND PRIOR ART

The present invention relates to a device for fitting and removal of brake calipers of a vehicle and to methods therefor.

Brake calipers are used to fix brake blocks and brake pistons pertaining to brakes of vehicles. Each of a vehicle's wheelshafts is usually provided with a brake caliper situated close to the respective wheel. On large and heavy vehicles the brakes have to be dimensioned to be able to bring the vehicle to a halt, which means that each brake caliper will be of considerable size and weight. Brake calipers often take the form of metal castings.

The servicing and repair of vehicle brakes sometimes involves having to remove the brake caliper from the vehicle and fit a new or renovated brake caliper. The brake caliper's weight and the fact that the bodywork and other parts of the vehicle limit accessibility to the brake caliper make it difficult for service staff to carry out its removal and fitting without lifting equipment which is powered pneumatically, hydraulically or electrically. It is inappropriate from an ergonomic perspective to undertake brake caliper removal and fitting without such lifting equipment.

US 2005/0081355 A1 refers to a device for fitting and removing a brake caliper. The device has a plurality of struts which the brake caliper rests upon and is connected to. The struts are connected to a lifting device which is powered hydraulically or electrically and by means of wheels can be moved on a floor surface.

U.S. Pat. No. 5,077,886 refers likewise to a device for fitting and removing a brake caliper. The device comprises for the brake caliper, a holder, which is also configured to cooperate with a brake disc to which the brake caliper is fitted.

SUMMARY OF THE INVENTION

Despite known solutions, there exists a need to further develop a device for the fitting and removal of brake calipers has been identified. Brake calipers may be oriented in different ways, both horizontally and vertically, which means that the service workshop needs to be provided with a plurality of different devices for the fitting and removal of brake calipers. Brake calipers may be of different makes, with consequently different geometrical shapes and sizes. This further increases the number of sets of devices for fitting and removal of brake calipers which service workshops need in order to enable them to carry out servicing work on brake calipers.

The object of the present invention is to propose a device for fitting and removal of brake calipers, which is suited to different types of brake calipers.

Another object of the invention is to propose a device for fitting and removal of brake calipers which are oriented in different ways on a vehicle.

A further object of the invention is to propose a device for fitting and removal of brake calipers which can be adapted to the brake caliper's center of gravity.

A further object of the invention is to propose a device for fitting and removal of brake calipers, which is of small dimensions.

A further object of the invention is to propose a device for fitting and removal of brake calipers, which presents good safety.

A further object of the invention is to propose a device for fitting and removal of brake calipers, which facilitates their removal.

These objects are achieved with a device for fitting and removal of brake calipers of the kind mentioned in the introduction, the device comprising the features of the present disclosure.

Such a device for fitting and removal of brake calipers is adaptable to different types of brake calipers and may be used in the fitting and removal of brake calipers which are oriented in different ways on vehicles. In a preferred embodiment of the invention, the device may be adapted to the brake caliper's center of gravity, thereby facilitating and the fitting and removal of the brake caliper. The device is also of relatively small dimensions, which simplifies its handling so that it can easily be fastened to the brake caliper. The fact that the device is fastened to, and engages with, the brake caliper enhances safety during the fitting and removal of the brake caliper, so that injuries are avoided.

Further advantages of the invention are indicated by the detailed description set out below.

BRIEF DESCRIPTION OF THE DRAWINGS

A preferred embodiment of the invention is described below by way of example with respect to the attached drawings, in which.

DETAILED DESCRIPTION OF PREFERRED EMBODIMENTS

Figure 1:
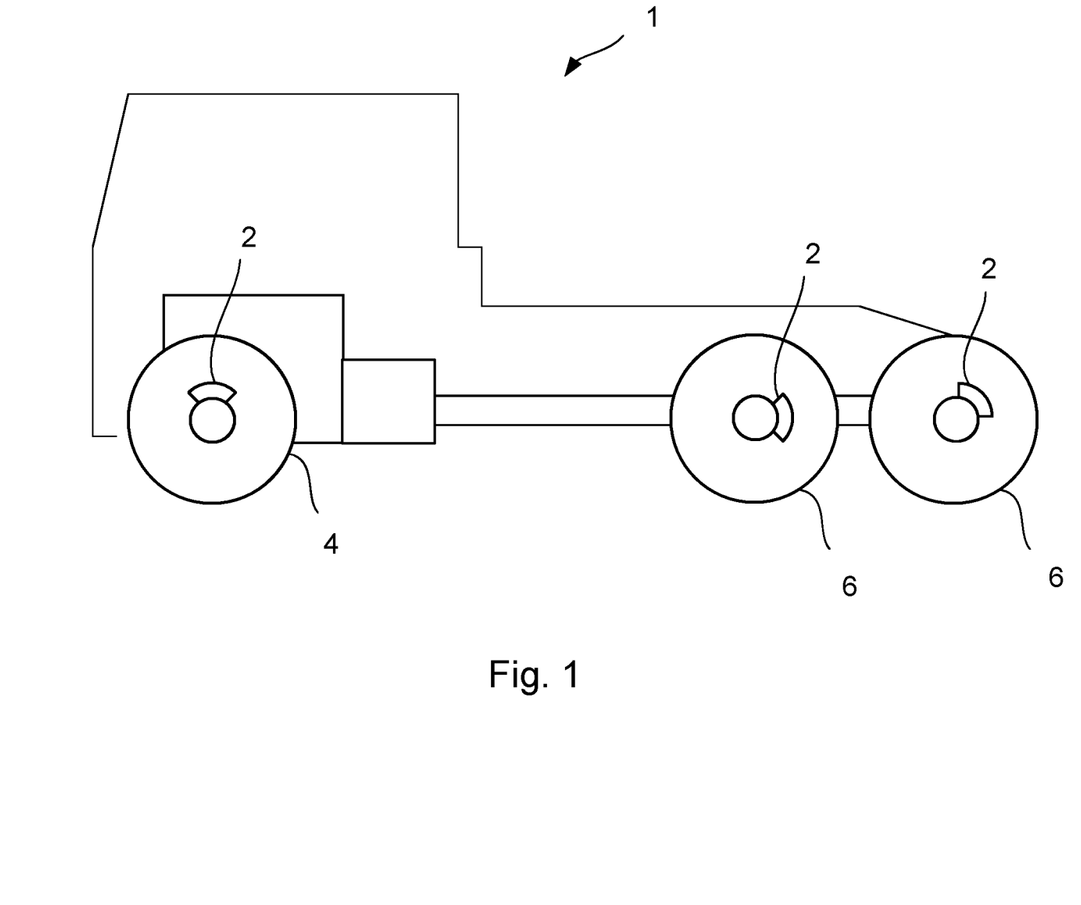
FIG. 1 depicts a vehicle in side view with brake calipers oriented in different ways.

FIG. 1 depicts a vehicle 1 in side view with brake calipers 2 oriented in different ways. On the vehicle's front wheel 4 the brake caliper 2 is oriented in a horizontal position, whereas the brake calipers on the vehicle's rear wheels 6 are respectively fitted in a vertical position and in a position between horizontal and vertical. The different orientations of the vehicle's brake calipers result in different requirements with regard to their fitting and removal.

Figure 2:
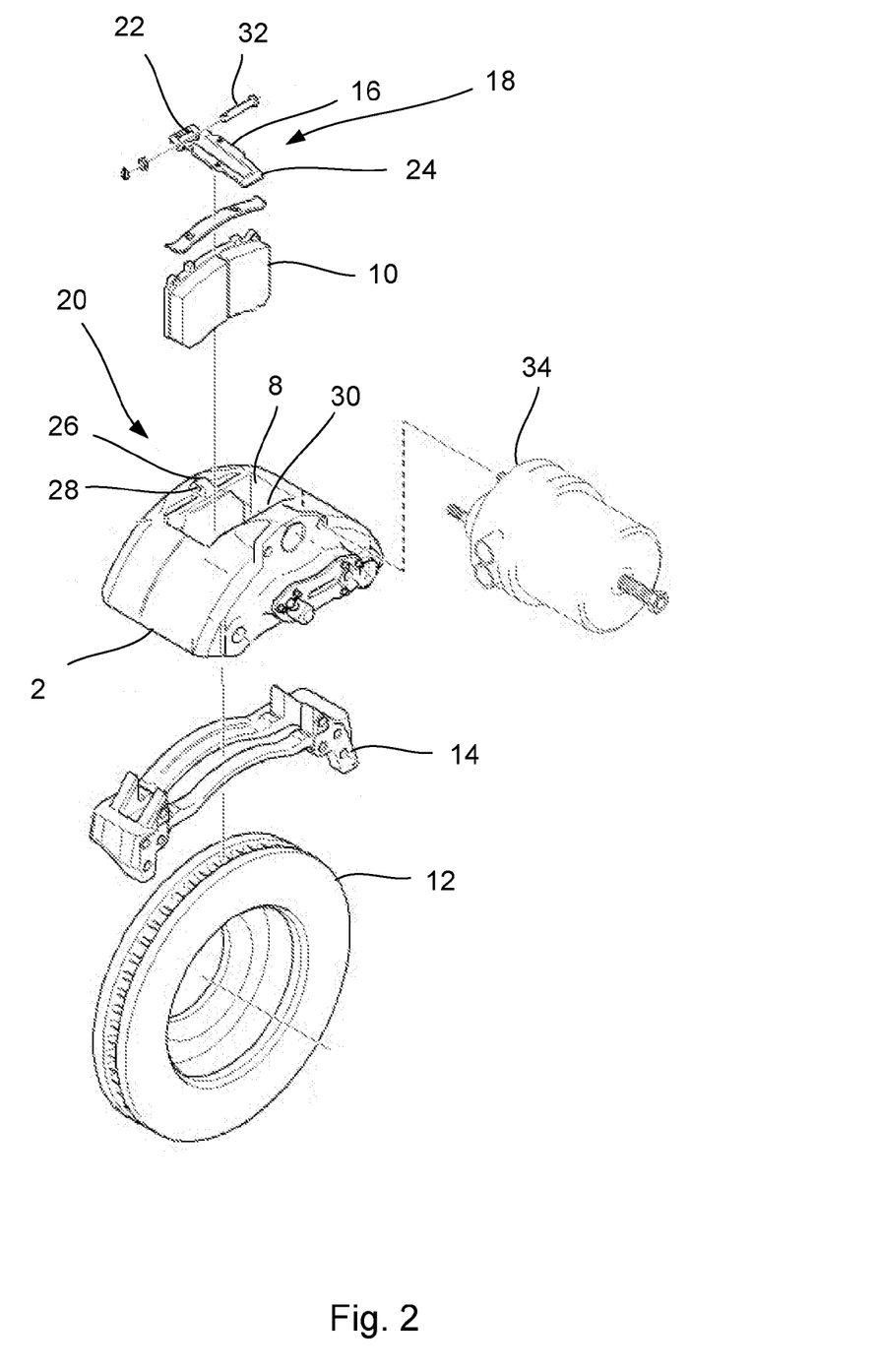
FIG. 2 is a perspective view of a brake caliper with associated components.

FIG. 2 is a perspective view of a brake caliper 2 with its associated components. The brake caliper is preferably made of metal and is dimensioned to absorb substantial forces. It is therefore of considerable weight and relatively large dimensions. An aperture 8 runs through the brake caliper 2 via which brake blocks 10 are fitted to cooperate with a brake disc 12. The blocks 10 are held in position by a brake block holder 14 and a brake caliper bracket 16 which has connecting portions 18 for connection to fastening points 20 on the brake caliper. In the embodiment of the brake caliper depicted in FIG. 2, the connecting portions 18 on the brake caliper bracket 16 take the form of a recess 22 on one side and a tongue 24 on the other side. The recess 22 on the brake caliper bracket cooperates with a first fastening point on the brake caliper in the form of a protrusion 26 which has a hole 28 running through it. The tongue 24 on the brake caliper bracket cooperates with a second fastening point on the brake caliper in the form of a cavity 30. Fitting the brake caliper bracket on the brake caliper 2 and thereby fixing the brake blocks 10 is achieved by moving the tongue 24 into the cavity 30, followed by the recess 22 being pressed down and moved across the protrusion 26 which has the hole 28 running through it. The bracket 16 is thereafter locked firmly on the brake caliper by means of a locking pin 32 inserted into the hole 28. The brake caliper also has fastening points 20 for connecting it to the vehicle, and a brake cylinder 34 for causing the brake blocks to abut against the brake disc 12 during the vehicle's braking.

Figure 3:
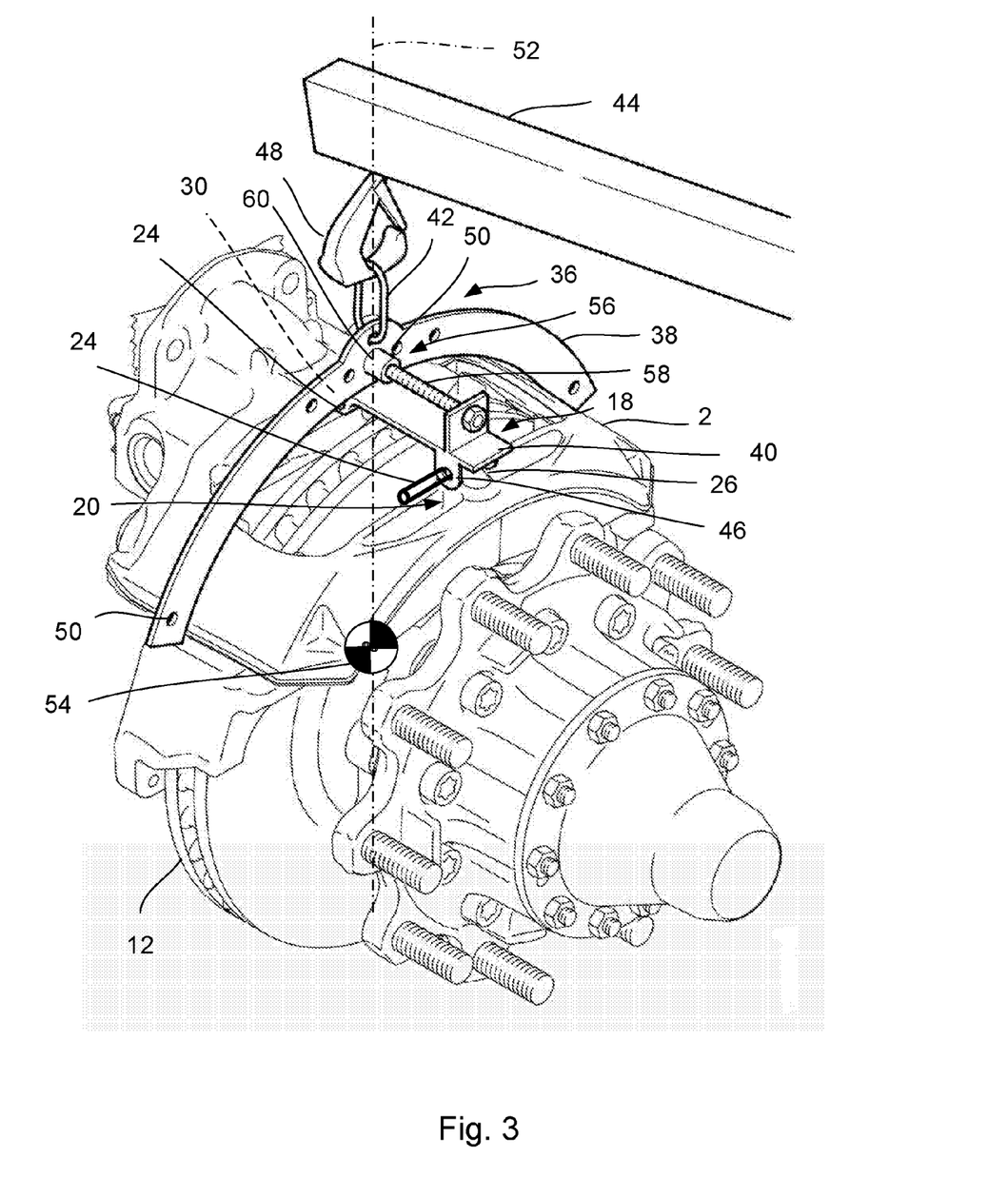
FIG. 3 is a perspective view of a device according to the present invention fastened to a brake caliper oriented in a first position

FIG. 3 is a perspective view of a device 36 for fitting and removal of brake calipers according to the present invention. The device 36 in FIG. 3 is fastened to a brake caliper 2 oriented in a first position. The device 36 comprises a frame portion and a fastening portion for fastening the device on the brake caliper. The frame portion 38 and the fastening portion 40 are connected to one another and the frame portion is provided with lifting means 42 for attaching a lifting device 44. The fastening portion comprises connecting portions 18 adapted to engage with at least one fastening point 20 for a component which cooperates with the brake caliper and which in the embodiment depicted takes the form of a brake caliper bracket 16. To connect the fastening portion to the brake caliper its connecting portions 18 are of substantially the same geometrical shape as those of the brake caliper bracket 16 which connect with the brake caliper. In the embodiment depicted the fastening portion is thus provided with apertured lugs 46 and a tongue 26. The apertured lugs cooperate with the first fastening point 20 on the brake caliper, which takes the form of the protrusion 26 with the hole 28 running through it. The fastening portion's tongue 24 cooperates with the brake caliper's second fastening point 20 which takes the form of the cavity 30. The fastening points 20 and the connecting portions 18 may also have other geometrical shapes. It is also possible for the fastening portion 40 to be such that it has at respective ends a plurality of different connecting portions 18 to make it possible to adapt the fastening portion and the device to different types of brake calipers. The fact that the device 36 is fastened to, and engages with, the brake caliper enhances safety during brake caliper fitting and removal, so that injuries are avoided.

The lifting means 42 for connecting the lifting device 44 takes the form in the embodiment depicted of a loop 42 which may be connected to a hook 48 of the lifting device. It is also possible for the lifting device to be configured in some other way for connecting the lifting means. The lifting device may for example take the form of an elongate element which is inserted in the lifting means. The frame portion 38 is preferably configured so that the lifting means may be situated at different points on the frame portion, depending on the brake caliper's orientation. A plurality of holes 50 running through the frame portion are therefore provided so that the lifting means can be relocated between the various holes. Alternatively, two or more lifting means may be provided on the frame portion instead of a single lifting means being relocated between the various holes.

The frame portion 38 and the fastening portion 40 are in a preferred embodiment adjustably connected to one another to make it possible for the lifting means 42 for connecting the lifting device 44 to be on a vertical line 52 which runs through the brake caliper's center of gravity 54. Fitting and removing the brake caliper is thus simplified because the brake caliper will maintain its orientation relative to the vehicle without changing its angle. A relocatable connection 56 between the frame portion and the fastening portion takes the form in the embodiment depicted of a spindle 58 which is connected to the fastening portion and runs through a hole 50 in the frame portion. A fastening flange 60 may be used to lock the frame portion's position along the spindle to make it possible for the lifting means 42 for connecting the lifting device 44 to be on a vertical line 52 which runs through the brake caliper's of gravity 54. It is also possible for the frame portion to be configured so that the fastening portion may be situated at different points on the frame portion. The fastening portion's spindle 58 may therefore be placed in any of the holes in the frame portion. The possibility of the fastening portion being at different locations on the frame portion enhances the scope for adapting the device to the brake caliper's orientation.

Figure 4:
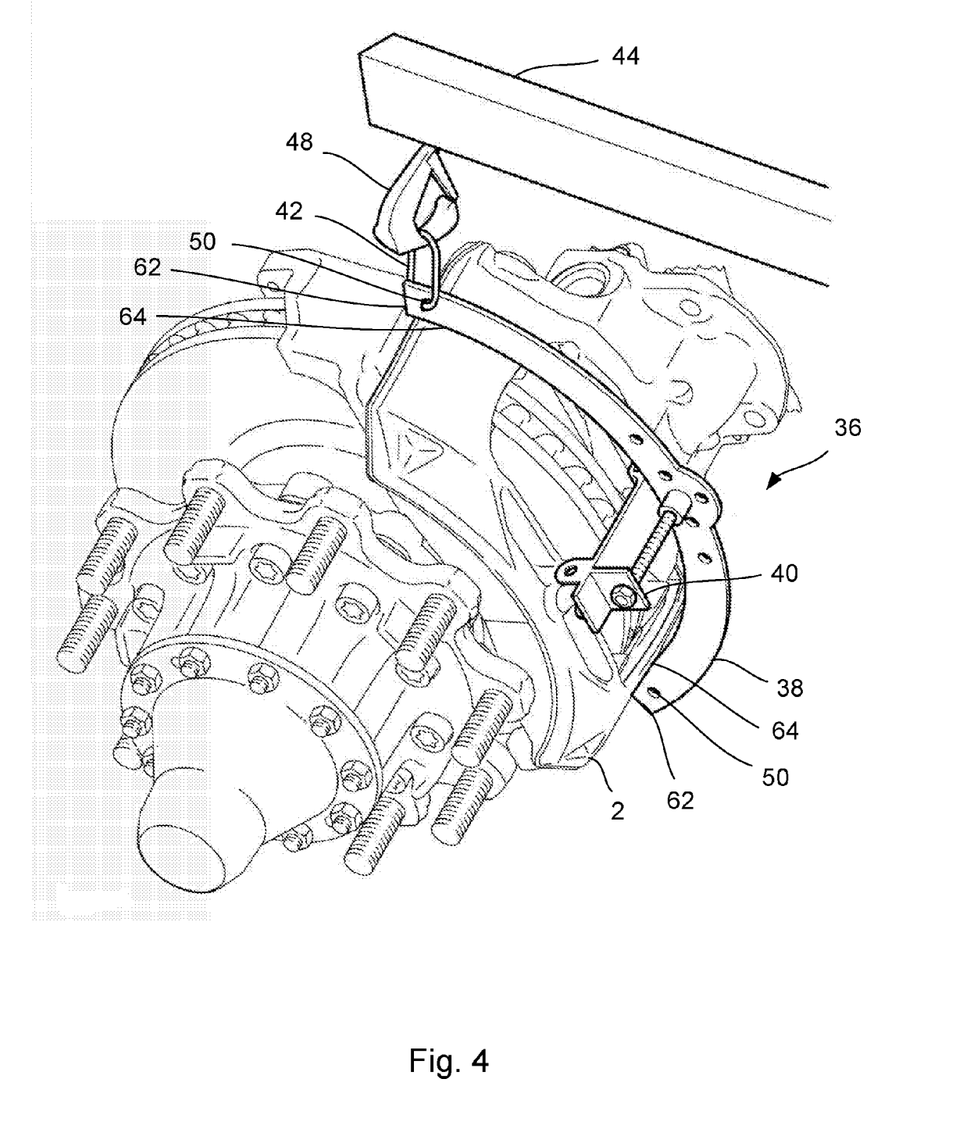
FIG. 4 is a perspective view of a device according to the present invention fastened to a brake caliper oriented in a second position.

FIG. 4 is a perspective view of a device 36 according to the present invention fastened to a brake caliper 2 oriented in a second position which corresponds to vertical positioning of the brake caliper. The frame portion 38 is preferably of arcuate shape, further enhancing the scope for adapting the device to the brake caliper's orientation. The arcuate shape means that the frame portion is provided at its end portions 62 with at least one contact surface 64 appropriate to the brake caliper. FIG. 4 shows the lifting means 42 relocated to a hole 50 running through an end portion 62 of the frame portion. The opposite end portions 62 of the fastening portion have their contact surfaces 64 abutting against the brake caliper, thereby improving the stability of the connection between the brake caliper and the device 36. To be able to adjust the distance between the brake caliper and the frame portion, adjusting screws (not depicted) may be provided at the frame portion's end portions 62, in which case their end surfaces then serve as their contact surfaces with the brake caliper. By rotating the adjusting screws the distance between their respective end surfaces and the frame portion may be adjusted, further improving the stability of the connection between the brake caliper and the device 36. The adjusting screws may for example be of the winged screw type to facilitate manual adjustment.

Figure 5:
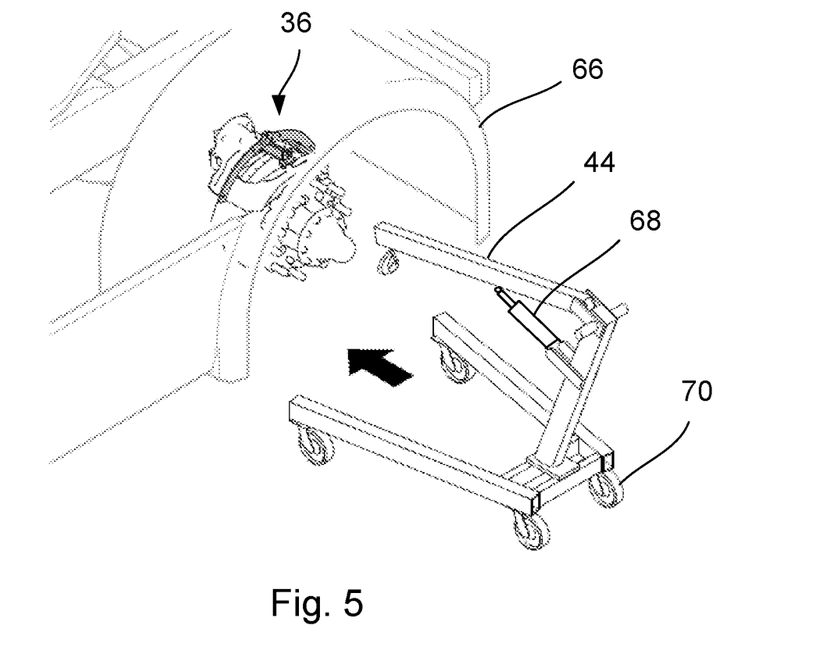
FIG. 5-7 illustrate the use of a device according to the present invention in the removal of a brake caliper.
Figure 6:
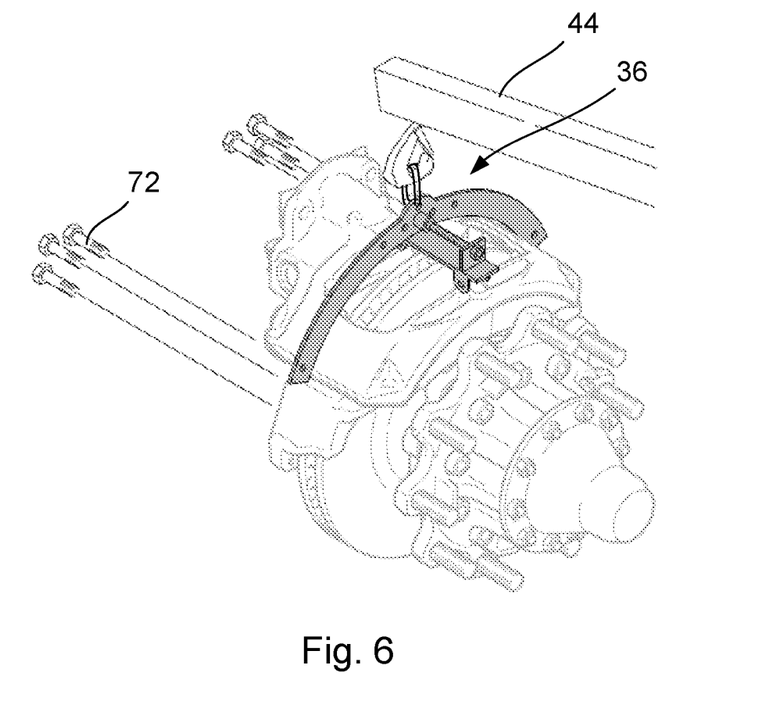
Figure 7:
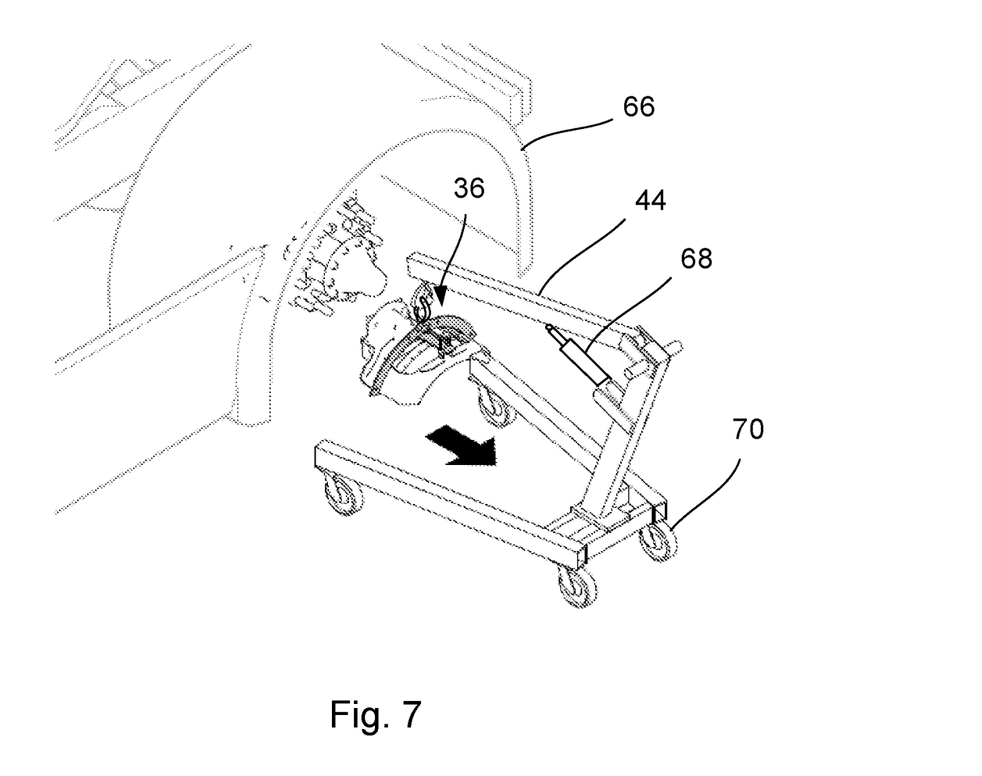

FIGS. 5-7 illustrate a method for fitting and removing a brake caliper 2 from a vehicle 1 by means of the device according to the invention. The method for removing the brake caliper comprises the steps of (a) removing the brake caliper bracket 16 and (b) fitting the device 36 in place of the bracket. In FIG. 5 steps (a) and (b) have taken place. FIG. 5 shows a mudguard 66 of the vehicle partly surrounding the location where the brake caliper is situated. A lifting device 44 with a hook 48 is moved towards the location where the brake caliper is situated. A power means 68 in the form of a hydraulic or pneumatic cylinder or an electric motor is provided on the lifting device. To make it easier to move to and from the location where the brake caliper is situated, the lifting device is provided with wheels 70. When the lifting device is in position adjacent to the brake caliper, the method goes on to (d) connecting the lifting device 44 to the lifting means 42, followed by (e) the brake caliper being released from the vehicle. FIG. 6 shows the lifting device connected to the lifting means, and threaded bolts 72 which fasten the brake caliper to the vehicle having been removed. The method then ends with the step of (f) removing the brake caliper from the vehicle by means of the lifting device 44 connected to the device 36, as depicted in FIG. 7.

To facilitate the removal of the brake caliper, it may be appropriate for step (d) to be preceded by a further step (c) of adjusting the frame portion and the fastening portion relative to one another so that the lifting means 42 for connecting the lifting device is on a vertical line 52 which runs through the brake caliper's center of gravity 54.

The method for fitting the brake caliper 2 is also illustrated by FIGS. 5-7, but in reverse order. The method comprises the steps of (a) fitting the device 36 on the brake caliper at the location intended for the brake caliper bracket 16 and (c) connecting a lifting device 44 to the lifting means 42. This is followed by a step (d) of moving the brake caliper to the vehicle by means of the lifting device 44 connected to the device 36, with the subsequent step of (e) fitting the brake caliper on the vehicle. The method then ends with the step of (f) releasing the device 36 from the brake caliper.

To facilitate the fitting of the brake caliper it may be appropriate for step (d) to be preceded by the further step of (c) adjusting the frame portion 38 and the fastening portion 40 relative to one another so that the lifting means 42 for connecting the lifting device 44 is on a vertical line 52 which runs through the brake caliper's center of gravity 54.

Cited components and features indicated above may within the scope of the invention be combined between different embodiments cited.

The invention claimed is:

1. A device for fitting and removal of a brake caliper having at least one fastening point configured for connection to a connecting portion of a brake caliber bracket, the device comprising:

a frame portion, and a fastening portion for fastening the device on the brake caliper, wherein the frame portion and the fastening portion are connected to one another, and the frame portion having lifting means for connecting a lifting device, the fastening portion comprises a connecting portion configured to engage with the at least one fastening point, and the connecting portion of the fastening portion is of substantially the same geometrical shape as the connecting portion of the brake caliper bracket.

2. A device according to claim 1, wherein the frame portion and the fastening portion are adjustably connected to one another to allow the lifting means for connecting the lifting device to be on a vertical line which runs through a center of gravity of the brake caliper.

3. A device according to claim 1, wherein the frame portion is configured to allow the lifting means for connecting the lifting device to be located at different points on the frame portion depending on an orientation of the brake caliper.

4. A device according to claim 1, wherein the lifting means for connecting the lifting device is a loop.

5. A device according to claim 1, wherein the frame portion is configured to allow the fastening portion to be located at different points on the frame portion depending on an orientation of the brake caliper.

6. A device according to claim 1, wherein the frame portion has an arcuate shape.

7. A device according to claim 1, wherein the frame portion is provided with at least one contact surface appropriate to the brake caliper.

\* \* \* \* \*